US006307669B1

(12) United States Patent
Flood et al.

(10) Patent No.: US 6,307,669 B1
(45) Date of Patent: Oct. 23, 2001

(54) L-BAND AMPLIFICATION WITH DETUNED 980NM PUMP

(75) Inventors: Felton A. Flood; Douglas W. Hall, both of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/417,262

(22) Filed: Oct. 12, 1999

Related U.S. Application Data
(60) Provisional application No. 60/109,393, filed on Nov. 20, 1998.

(51) Int. Cl.[7] .................................................. H01S 3/00
(52) U.S. Cl. ........................................ 359/341.3; 359/345
(58) Field of Search .................................... 359/341, 345, 359/341.3

(56) References Cited

U.S. PATENT DOCUMENTS

| | | | |
|---|---|---|---|
| 5,287,216 | * 2/1994 | Chirravuri et al. | 359/341 |
| 6,049,418 | * 4/2000 | Srivastava et al. | 359/341 |
| 6,144,486 | * 11/2000 | Bennett et al. | 359/341 |

OTHER PUBLICATIONS

Pedersen B et al: "Gain and Noise Properties of Small–Signal Erbium–Doped Fiber Amplifiers Pumped in the 980nm Band" IEEE Photonics Technology Letters, Jun. 1992, USA, vol. 4, No. 6, pp. 556–558.
Percival R M: "Erbium–Doped Fibre Amplifier with Constant Gain for Pump Wavelengths Between 966 and 1004 nm" Electronics Letters,GB,IEE Stevenage, vol. 27, No. 14, Jul. 4, 1991, pp. 1266–1268.

Ono H et al: "1.58mum Band ER3+–Doped Fibre Amplifier Pumped in the 0.98 and 1.48mum Bands" Electronics Letters, GB, IEE Stevenage, vol. 33, No. 10, May 1, 1997, pp. 876–877.
Sun Y et al: "An 80 nm Ultra Wide Band EDFA With Low Noise Figure and High Output Power" IOOC–ECOC. European Conference on Optical Communication ECOC. International Conference on Integrated Optics and Optical Fibre Communication IOOC,XX,XX, vol. 5, Jan. 1, 1997, pp. 69–72.
Massicott J F et al: "Low Noise Operation of ER3+ Doped Silica Fibre Amplifier Around 1.6 um" Electronics Letters, GB,IEE Stevenage, vol. 28, No. 20, Sep. 24, 1992, pp. 1924–1925.
Pedersen et al., "Gain and Noise Properties of Small–Signal Erbium–Doped Fiber Amplifiers Pumped in the 980–nm Band", IEEE Photonics Technology Letters, vol. 4, No. 6, Jun. 1992.

(List continued on next page.)

Primary Examiner—Mark Hellner
(74) Attorney, Agent, or Firm—Svetlana Short (57) ABSTRACT

A method of operating an optical amplifier for improved gain and pump-to-signal conversion efficiency in a long wavelength spectral region (L-band) of the emission spectrum of a rare earth doped gain medium having a known pump absorption band involves the steps of providing an optical signal to the amplifier having a large-signal input power; and providing pumping light to the amplifier having a wavelength that is different from a center wavelength of the known pump absorption band for amplifying the optical signal. Signal gain and improved pump-to-signal conversion efficiency was demonstrated for an erbium L-band signal by detuning the pump between about ±0–30 nm on either side of the pump band center wavelength of 979–980 nm. An optical amplifier employing the described method is also disclosed.

19 Claims, 5 Drawing Sheets

OTHER PUBLICATIONS

Becker et al., "Erbium–Doped Fiber Amplifier Pumped in the 950–1000 nm Region", IEEE Photonics Technology Letters, vol. 2, No. 1, Jan. 1990.

Massicott et al., "High Gain Broadband, 1–6 $\mu$m $Er^{3+}$ Doped Silica Fibre Amplifier", Electronics Letters, vol. 26, No. 20, Sep. 27, 1990.

Percival et al., "Erbium–Doped Fibre Amplifier with Constant Gain for Pump Wavelengths Between 966 and 1004nm", Electronics Letters, vol. 27, No. 44, Jul. 4, 1991.

Pedersen et al., "Gain and Noise Penalty for Detuned 980–nm Pumping of Erbium–Doped Fiber Power Amplifiers", IEEE Photonics Technology Letters, vol. 4, No. 4, Apr. 1992.

Wysocki et al., "Erbium–Doped Fiber Amplifier Flattened Beyond 40 nm Using Long–Period Grating".

Srivastava et al., "Transmission of 100 WDM 10 Gb/s Channels Over 400 km of TrueWave™ Fiber".

* cited by examiner

L-BAND AMPLIFICATION WITH DETUNED 980NM PUMP

This application claims benefit of Provisional Application 60/109,393 filed Nov. 20, 1998.

FIELD OF THE INVENTION

The present invention relates to optical amplifiers, and more particularly, to a method for improved L-band amplification using detuned 980 nm pump light and to a device utilizing such method.

BACKGROUND OF THE INVENTION

Optical telecommunications service providers continue to demand more data capacity and higher data transmission speeds to service their customers' current and future requirements. In systems employing optical amplifiers and, particularly, EDFAs, channel density has been limited by the usable gain bandwidth of the EDFA. This bandwidth is on the order of 35 nm even when gain flattening filters are used to flattened the erbium gain spectrum for multichannel amplification. Three techniques for increasing system capacity in multichannel lightwave systems include (1) increasing bit rate per channel, (2) increasing the number of channels by decreasing channel spacing, and (3) increasing number of channels by increasing the total gain/transmission bandwidth of the gain media. Increasing the bit rate per channel is not always a viable solution as many installed systems cannot operate beyond the current OC-48 bit rate (2.5 Gb/s). Likewise, fiber nonlinearities limit reducing channel spacing below the current values of 50 GHz–100 GHz. Thus increasing the EDFA gain bandwidth allows a direct path for increasing system capacity while maintaining channel spacing and bit rate per channel. As far back as 1990, Ainslie et al., High gain, broadband 1.6 micron $ER^{3+}$ doped silica fiber amplifier, *Electronics Letters*, volume 26, pp. 1645–1646 (1990) investigated the long band (1565–1610 nm) utility of the erbium gain spectrum. Recently, Srivastava et al., 1 Tb/s transmission of 100 WDM 10 Gb/s channels over 400 km of Truewave fiber, Tech. Dig. OFC'98, Post deadline paper PD10-1, San Jose, Calif., 1998, demonstrated application of silica EDFAs in the 1.6 micron band (L-band). Sun et al., Ultrawide band erbium-doped silica fiber amplifier with 80 nm of bandwidth, PROC. OAA, Post deadline paper PD 2-2, Victoria, BC Canada, 1997, discussed a split band architecture that amplifies both the conventional C-band (1530 nm–1560 nm) and the L-band, providing a total gain bandwidth of 80 nm. Thus L-band amplification offers a demonstrable, but undeveloped, solution to the bandwidth constraints in WDM lightwave systems.

It is appreciated by those skilled in the art that EDFAs operating in the L-band (herein defined as the spectral range from about 1560–1615+ nm) typically have features that distinguish them from amplifiers designed to work in the heavily used C-band from approximately 1530 nm to 1560 nm. Among the notable differences is a relatively flatter gain spectra at low inversions (i.e., 0.4 versus 0.6–0.7), which necessitates lengths of erbium doped fiber on the order of greater than or equal to about 75 m up to about 300 m (for current typical Er concentrations), in contrast to less than or equal to about 50 m for conventional C-band devices. This is due at least in part to the relatively low emission cross section of erbium for wavelengths greater than approximately 1560 nm. A consequence of the unusually long erbium doped fiber lengths required for low inversion amplification is the generation of large amounts of reverse traveling ASE. Moreover, the unique L-band operating environment impacts the choice of pump wavelength in the 980 nm absorption band. In any event, EDFA L-band amplifiers are an essential enabling technology for systems operating in what is now referred to as the $4^{th}$ generation telecommunications window.

Pump wavelength detuning in the 980 nm band for C-band amplification, primarily intended towards relaxing the wavelength constraints on 980 nm semiconductor pump laser diodes, has been reported on by a number of authors. Pederson et al., *Gain and Noise Penalty for Detuned 980 nm Pumping of Erbium-Doped Fiber Power Amplifiers*, IEEE Photonics Technology Letters, Vol. 4, No. 4, pp. 351–353 (April 1992) measured small-signal gain and noise performance of erbium-doped fiber power amplifiers pumped in the 980 nm band as a function of fiber length and pump wavelength. Their findings, in part, showed that signal output power for a C-band input signal at 1551 nm decreased as the pump wavelength was detuned ±20 nm from the 979 nm absorption peak. Pederson et al., *Gain and Noise Properties of Small-Signal Erbium-Doped Fiber Amplifiers Pumped in the 980-mn Band*, IEEE Photonics Technology Letters, Vol. 4, No. 6, pp. 556–558 (June 1992) examined the effects of pump-wavelength detuning on small-signal EDFA's for C-band input signals at 1532 mn and 1551 nm (see FIG. 2 therein). Percival et al., *Erbium-Doped Fibre Amplifier With Constant Gain For Pump Wavelengths Between 966 and 1004 nm*, Electronics Letters, Vol. 27, No. 14, pp. 1266–1268 (July 1991) reported constant gain for a C-band input signal at 1536 nm over a 38 nm pump range centered at 980 nm provided the fiber had a correct cut-off wavelength.

In contrast to the reported work, the inventors now describe the heretofore unappreciated benefits of 980 nm pump detuning for L-band amplification in the condition of large-signal input power. These benefits include L-band gain and improved pump-to-signal conversion efficiency. As used herein, large-signal input a power refers to input signal conditions in the presence of which the optical amplifier operates in saturation and yields an output signal power which essentially does not depend upon input signal power, but rather depends solely on the pump power, such that $P_{out}=KP_{pump}$, where K essentially represents the efficiency of the amplifier. In contrast, small-signal amplification provides that the output signal power is proportional to the input signal power via the amplification or gain of the amplifier such that $P_{out}=GP_{in}$. These are terms well understood by those skilled in the art.

SUMMARY OF THE INVENTION

The invention is broadly directed to a method, and associated device, involving improved L-band optical signal amplification by detuned 980 nm band pumping resulting in, among other things, improved gain and pump to signal conversion efficiency. Additional features and advantages of the invention will be set forth in the description which follows and/or may be learned by practice of the invention. The objective and other advantages of the invention will be realized and obtained by the apparatus and method particularly pointed out in the written description and claims hereof, as well as the appended drawings.

An embodiment of the invention is directed to a method of operating an optical amplifier for optical signal amplification in a long wavelength spectral region, e.g. from about 1560–1615+ nm. This spectral region is referred to herein and appreciated by those skilled in the art as the L-band of a rare earth doped gain medium. It has a known pump absorption band centered at about 980 nm and another centered at about 1480 nm; the former being of practical significance for the present invention. This embodiment involves inputting to the amplifier an optical signal having a large signal power and pumping the gain medium with pump light having a wavelength that is different from a center wavelength of the known pump absorption band. In various aspects of this embodiment, the center wavelength of the known pump absorption band is 980 nm; the gain medium is a rare earth doped optical fiber waveguide and preferably an erbium doped fiber; the pump light wavelength is in a range from 0–30 nm on either side of the center wavelength and preferably from 5–30 nm on either side of the center wavelength; and the gain medium has a length greater than or equal to about 75 meters, typically between 100–300 meters.

Another embodiment of the invention involves a method of operating an optical amplifier for amplifying an optical signal in the L-band of the emission spectrum of a rare earth doped gain medium having a known pump absorption band that includes inputting into the optical amplifier an optical signal having a large signal input power and providing pump light to the amplifier that is detuned from a center wavelength of the known pump absorption band for amplifying the optical signal where the detuned pump wavelength operates to provide an amplified output signal having a power that is greater than the output signal power obtained at the pump center wavelength. In various aspects of this embodiment, the center wavelength of the known pump absorption band is 980 nm; the gain medium is a rare earth doped optical fiber waveguide and preferably an erbium doped fiber; the pump light wavelength is in a range from 0–30 nm on either side of the center wavelength and preferably from 5–30 nm on either side of the center wavelength; and the gain medium has a length greater than or equal to about 75 meters, typically between 100–300 meters.

In another embodiment, the invention involves a method of operating an optical amplifier for amplifying an optical signal in the L-band of the emission spectrum of a rare-earth doped gain medium having a known pump absorption band, including providing an optical signal to the amplifier having a large signal input power and pumping the gain medium with pump light having a wavelength that is detuned from a center wavelength of the known pump absorption band such that the measured amplified spontaneous emission (ASE) traveling counterdirectionally to the pump light is less than the counterdirectionally traveling measured ASE at the pump band center wavelength.

In a further embodiment, the invention relates to an optical amplifier having a rare earth doped gain stage exhibiting an emission spectrum and having a known pump wavelength absorption band for amplifying an input optical signal in the L-band of the emission spectrum wherein the signal has a large input signal power, and a pump light source that operates at a wavelength different from the center wavelength of the pump absorption band coupled to the gain stage such that the amplified output signal from the amplifier has a signal power at the detuned pump wavelength that is greater than the output signal power due to pumping at or substantially at the pump center wavelength. In various aspects of this embodiment, the pump center wavelength is about 980 mn; and the detuned pump wavelength is in the range from 0–30 nm on either side of the center wavelength, and preferably from 5–30 nm on either side of the pump center wavelength.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description, serve to explain the principles of the invention.

DETAILED DESCRIPTION OF THE PREFERRED EMBODIMENTS OF THE INVENTION

Figure 1:
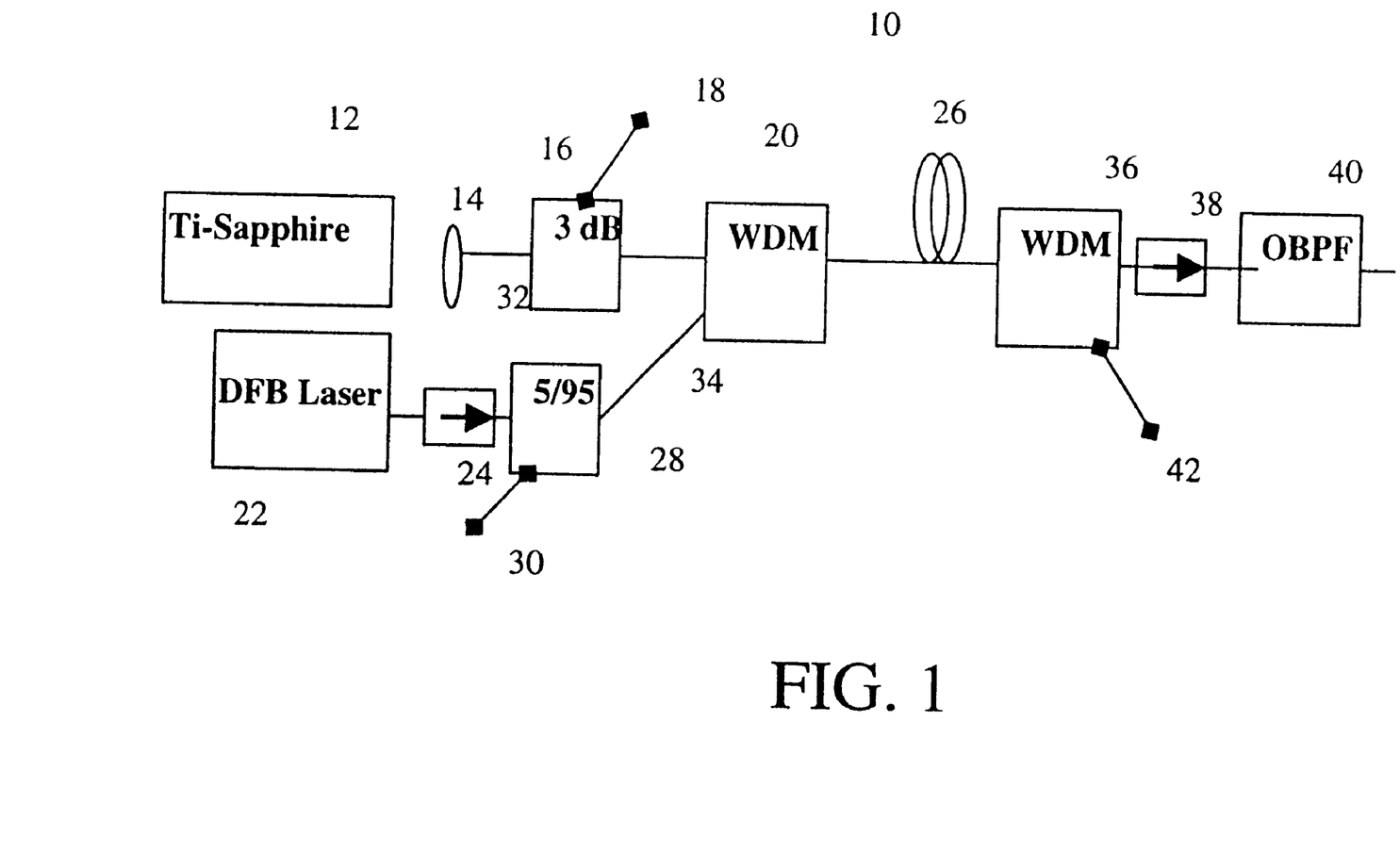
FIG. 1. is a schematic according to an embodiment of the invention of an experimental set-up for measurement of pump power, output signal power, backward ASE, and remnant pump power.

FIG. 1 is an experimental setup that was used to measure optical signal output power, backward ASE, pump power and remnant pump power. Using the setup schematically illustrated in FIG. 1, we conducted a detailed experiment to verify the impact of varying pump wavelength about the 980 nm absorption peak for a large input power optical signal in the erbium L-band. A tunable Ti-Sapphire pump laser 12 (pumped by an argon-ion laser, not shown), was coupled into the pigtail 32 of a 3 dB coupler 16 by an optical element 14. One-half of the input pump light was directed by the 3 dB coupler 16 to a power detector 18 denoted by the double diamond icon in FIG. 1. The remaining pump light propagated to and through WDM 20 into active amplifier fiber 26 which consisted of 100 meters of Type I erbium fiber. DFB laser 22 was used as the optical signal source and outputted a saturating signal at 1565 nm which propagated through isolator 24 and through the tap coupler 28 from where it was co-directionally coupled into active fiber 26 by WDM 20. WDM 36, located downstream of the active fiber 26, propagated the amplified optical signal through isolator 38 and past optical bandpass filter 40 from where it was sent into a power monitor (not shown) for measuring the optical signal output power, while remnant pump power was coupled via WDM 36 into a power monitor 42 denoted by the double diamond icon as shown. The optical bandpass filter is centered at 1565-mn (signal wavelength) and has a 1-nm 3 dB bandwidth.

As is well appreciated by those skilled in the art, ASE is generated in active fiber 26 due to excitation by the pump light, a portion of the ASE traveling in a reverse direction, i.e., counterdirectionally to the input optical signal. This reverse traveling ASE is coupled by WDM 20 through waveguide path 34 into tap coupler 28 where five percent of the backward traveling ASE was input to power monitor 30 denoted by the double diamond icon as shown. In an exemplary embodiment of the invention, the optical signal output from DFB laser 22 was set at 1565 nm. At this signal wavelength four sets of measurement data were taken with varying input signal powers of a) 2.0 dBm, b) 0.15 dBm, c) −4.93 dBm, and d) −9.91 dBm, all of which were sufficient to saturate the erbium doped fiber 26. Powers are measured at the output of optical filter, and include passive loss due to WDM (0.5 dB), isolator (0.6 dB), and optical bandpass filter (1.4 dB).

Figure 2:
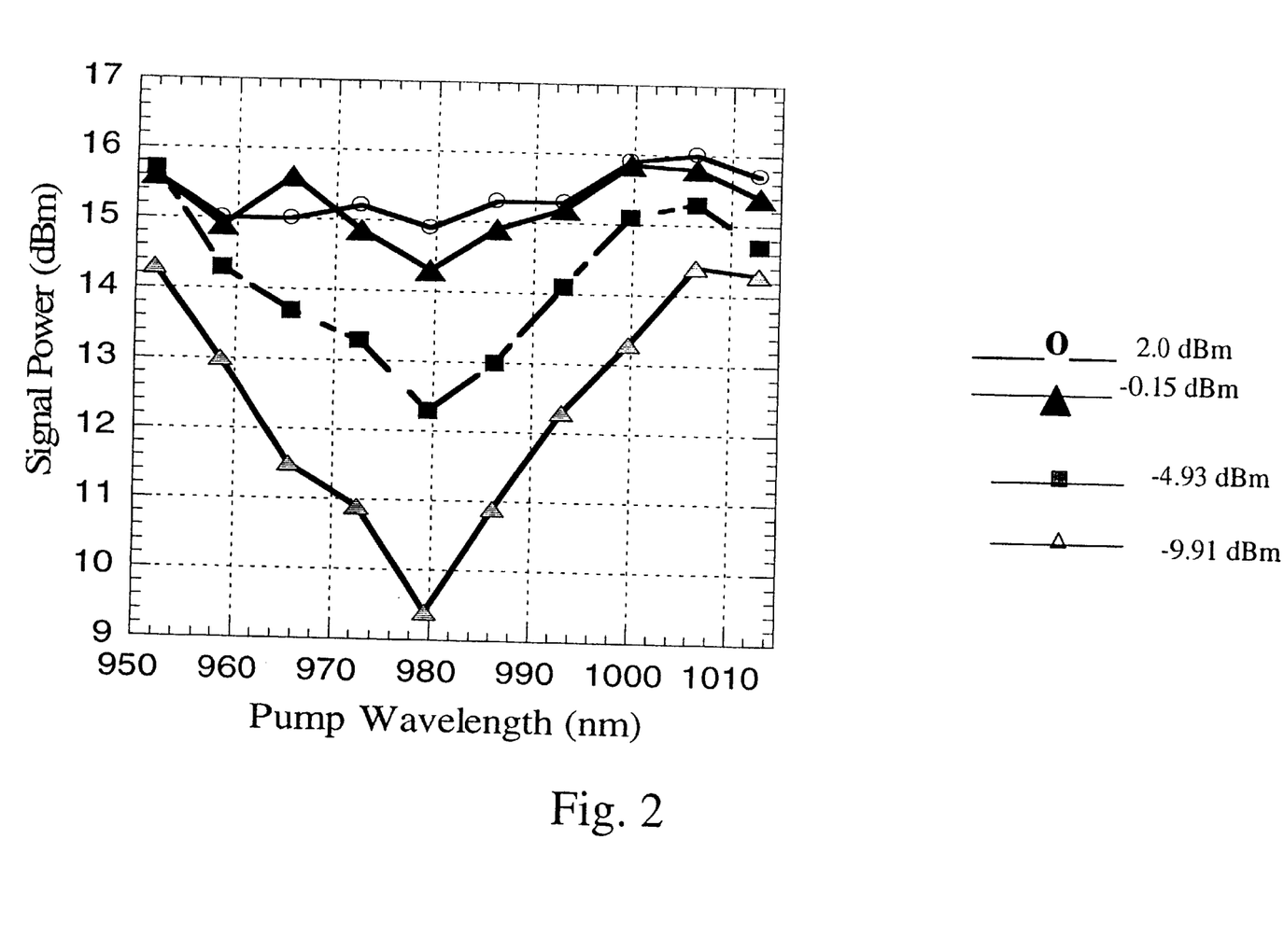
FIG. 2. is a plot of output signal power as a function of pump wavelength for four values of input signal powers according to an embodiment of the invention.
Figure 3:
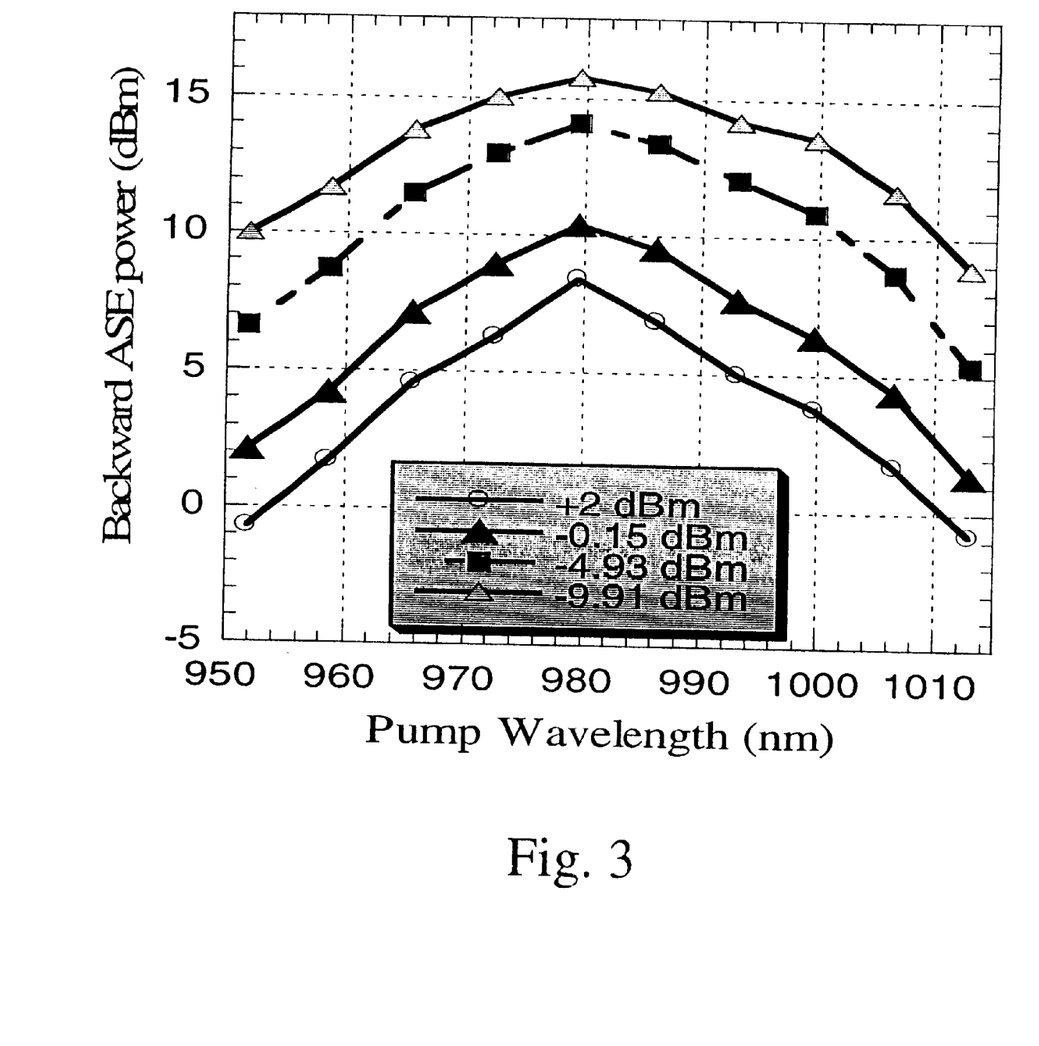
FIG. 3. is a plot of backward ASE power versus pump wavelength for four values of input signal powers according to an embodiment of the invention.

The pump laser 12 provided a tunable output signal having a constant power of 20 dBm (+/−0.3 dB). For case (c), which closely corresponds to 32 channels of −20 dBm per channel input power, tuning the pump wavelength from 980 nm to 954 nm (−26 nm) or to 1007 nm (+27 nm) resulted in a 3 dB increase in output signal power, and thus increased pump-to-signal conversion efficiency, as shown in FIG. 2. Also shown in FIG. 2 are plots of signal power versus pump wavelength for cases (a), (b) and (d) listed above, corresponding to minimum gains of 13 dB, 14.6 dB, 17.2 dB, and 19.4 dB respectively, for the four input signal power conditions a, b, c, and d. We believe that the increase in signal power as a fumction of pump wavelength detuning from the center wavelength of the 980 nm pump absorption band is at least partly due to a reduction in backward traveling ASE, as the plots show in FIG. 3. Backward ASE also depends upon coil length. As mentioned above, the erbium doped fiber 26 had a length of 100 meters and all of the optical input signal powers were large signal inputs as described above. The impact of pump wavelength detuning and output signal power as shown in FIG. 2 is similar to some reported findings for C-band amplifiers operating in the self-saturated regime (ie., small signal input power), however, that being of no practical interest. Pump absorption within the erbium fiber also appears to play a role in the described phenomenon. We hypothesize that backward ASE power and pump absorption are co-dependent. Although not measured, we expect noise figure to increase as pump wavelength is tuned away from the absorption peak due to the decrease in the front end inversion of the gain medium.

Thus, according to the exemplary embodiment described above, detuning the pump wavelength by +27/−26 nm in the range from 0–30 nm on either side of the center wavelength of the pump absorption band produced improved gain and conversion efficiency in the operating enviromnent of L-band signal amplification. Specifically, an improvement of 3 dB for an input signal power of −4.93 dBm at 1565 nm was achieved by detuning the pump from the 980 nm pump center wavelength. In addition to the benefits mentioned above, there may now be instances where 1480 nm pumps with their associated technical issues (e.g., heat dissipation), or vendor issues (e.g., availability/price) can be replaced with detuned 980 nm pump laser diodes in L-band amplifiers.

Figure 4:
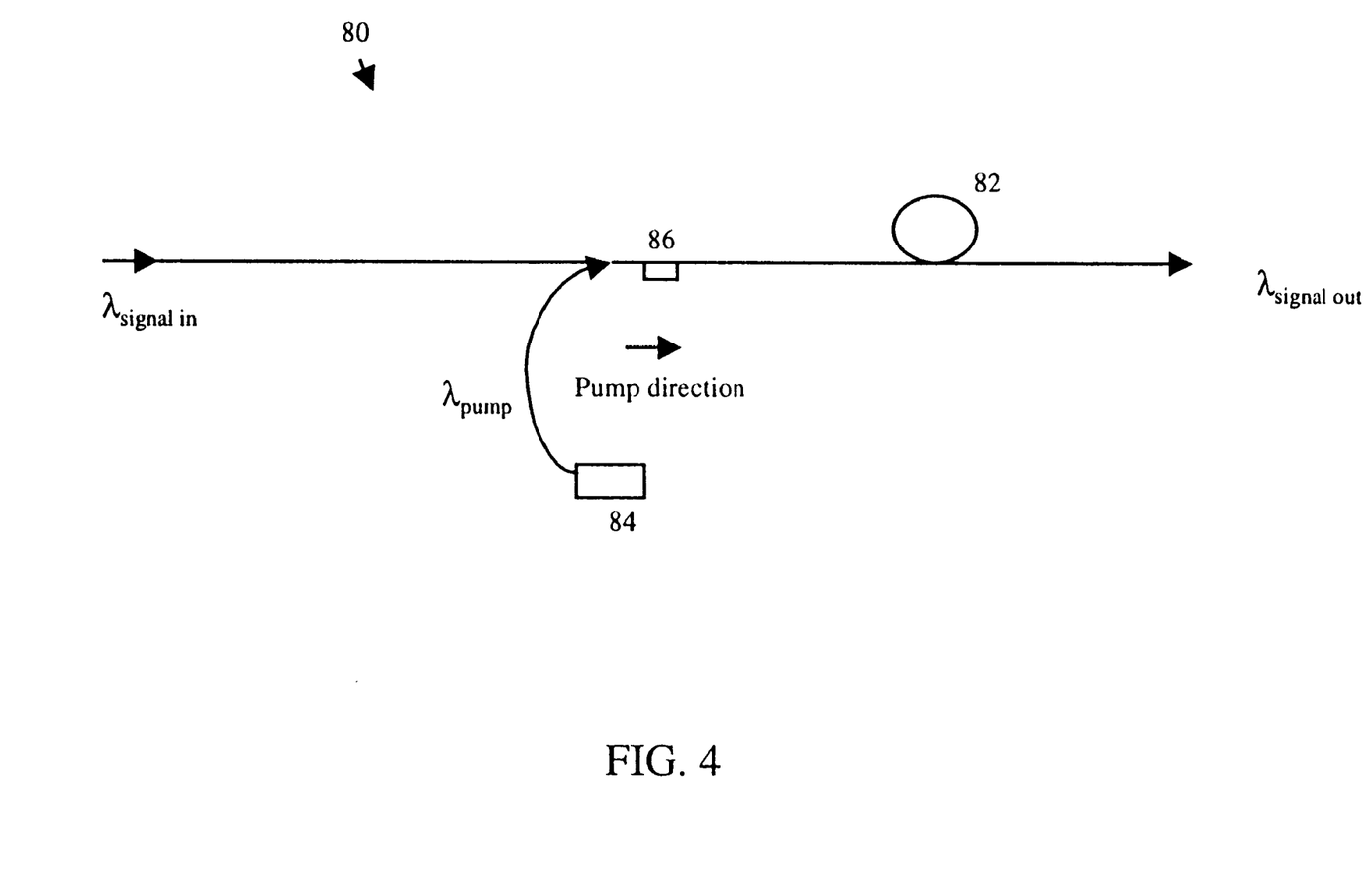
FIG. 4 is a schematic representation of an amplifier embodiment of the invention.
Figure 5:
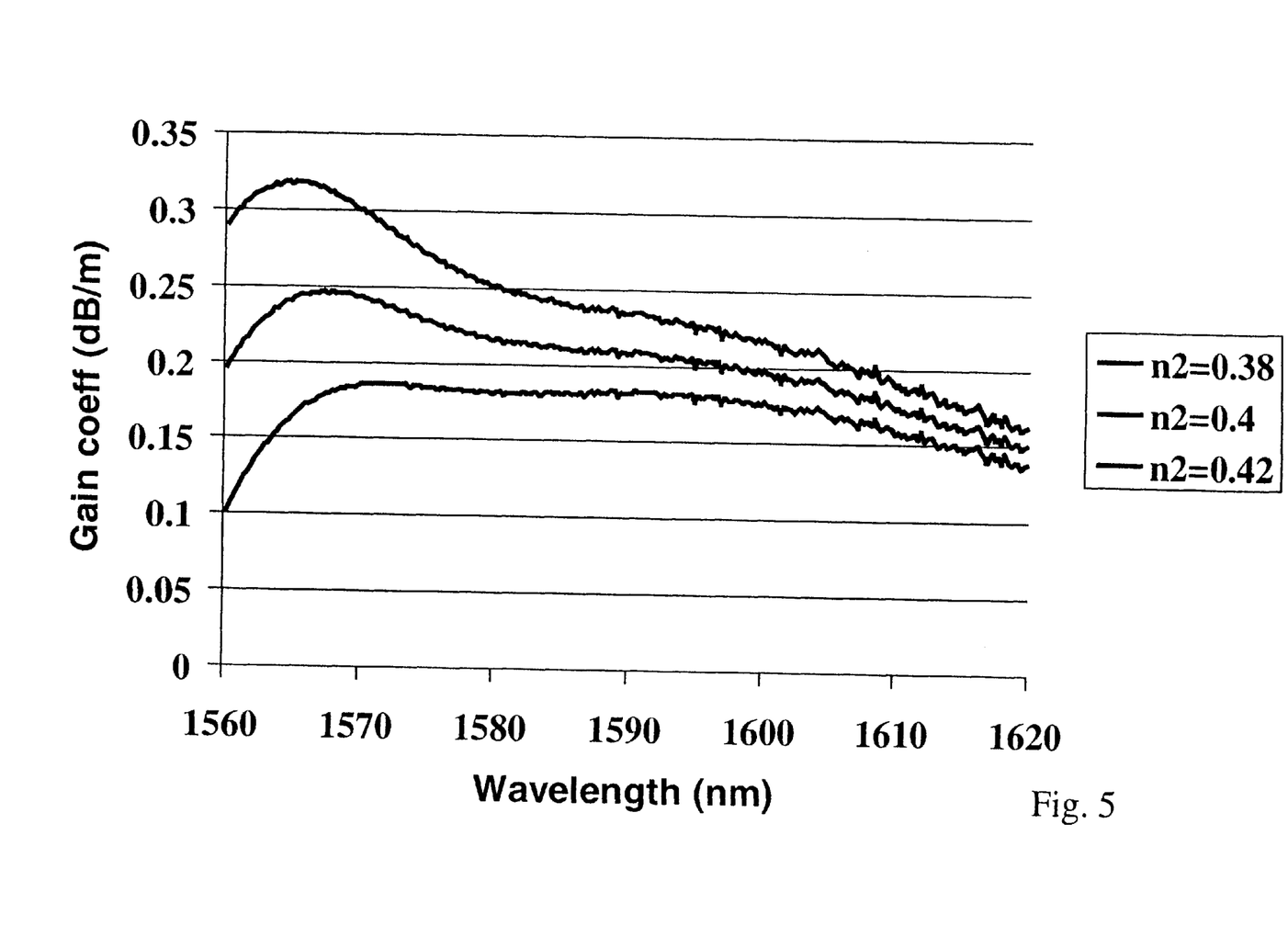
FIG. 5 shows a typical emission profile of Type I Er fiber.

According to another embodiment of the invention shown schematically in FIG. 4, an optical amplifier 80 includes a rare earth doped fiber gain stage 82, preferably an erbium doped fiber, having an L-band emission spectrum as representatively shown in FIG. 5, and a known pump wavelength absorption band centered at about 980 nm for amplifying an input signal having a large input signal power capable of saturating the gain medium and being of a signal wavelength in a long wavelength region of the emission spectrum, preferably the L-band referred to herein as extending from about 1560 nm to 1615+ nm. A pump light source 84 emitting in the 980 nm pump band operates at a wavelength that is different from the center wavelength of 980 nm and preferably in the range from +/−5–30 nm from the center wavelength. As shown, the pump light is forward coupled into the erbium doped fiber via the coupler 86. Other pumping schemes are also possible. For example, in the detuned pump region where there may be remnant forward traveling (i.e., co-propagating with the signal) pump power, a pump light reflector could be used to reinject the remnant pump light into the fiber in a counter-propagating direction, or reverse feed-forwarding it to the input of the active fiber, as those skilled in the art would appreciate. Co- and counter-directional pumping is also contemplated. Counter-directional pumping alone does not appeax advantageous due to the need to maintain high front end inversion for good noise performance of the amplifier.

It will be appreciated and is intended herein, that the exemplary embodiment relating to a method of the invention described above fully applies in its teachings to the amplifier embodiment presently described, and vice versa.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:

1. A method of operating an L-Band optical amplifier for improved gain and pump-to-signal conversion efficiency in a long wavelength spectral region of the emission spectrum of a rare earth doped gain medium having a known pump absorption band, comprising the steps of:
    a) providing an optical signal to the L-Band amplifier having a large-signal input power; and
    b) providing pumping light to the L-Band amplifier having a wavelength that is different from a center wavelength of the pump absorption band for amplifying the optical signal, such that the L-Band amplifier's gain is greater than gain at the center wavelength.

2. The method of claim 1, wherein the pumping light wavelength is in a range of ±30 nm from the center wavelength of the known pump absorption band.

3. The method of claim 2, wherein the pumping light wavelength is in a range of ±5 to 30 nm from the center wavelength of the known pump absorption band.

4. The method of claim 1, wherein the amplifier comprises a rare earth doped fiber gain medium.

5. The method of claim 4, wherein the rare earth doped fiber includes erbium as the punp light absorbing dopant.

6. The method of claim 4, wherein the amplifier's rare earth doped fiber has a length greater than or equal to about 75 m.

7. The method of claim 2, wherein the center wavelength of the known pump absorption band is about 980 nm.

8. The method of claim 3, wherein the center wavelength of the known pump absorption band is about 980 nm.

9. The method of claim 1, wherein the L-band is from about 1565–1615 nm.

10. A method of operating an optical amplifier for improved gain and pump-to-signal conversion efficiency in a long wavelength spectral region (L-band) of the emission spectrum of a rare earth doped gain medium having a known pump absorption band, comprising the steps of:
    a) providing an optical signal to the amplifier having a large-signal input power; and
    b) providing pumping light to the amplifier having a wavelength that is detuned from a center wavelength of the known pump absorption band for amplifying the optical signal such that a value of the amplified signal power at any detuned pump wavelength is greater than the amplified signal power at the pump band center wavelength.

11. The method of claim 10, wherein the step of providing pumping light to the amplifier comprises detuning the pump light wavelength from the center wavelength in the range from about ±5 to 30 nm.

12. The method of claim 10, wherein the center wavelength is about 980 nm.

13. The method of claim 10, wherein the L-band is from about 1565–1615 nm.

14. A method of operating an optical amplifier for improved gain and pump-to-signal conversion efficiency in a long wavelength spectral region (L-band) of the emission spectrum of a rare earth doped gain medium having a known pump absorption band, comprising the steps of:

a) providing an optical signal to the amplifier having a large-signal input power; and b) providing pumping light to the amplifier having a wavelength that is detuined from a center wavelength of the known pump absorption band for amplifying the optical signal such that a measured value of ASE traveling counterdirectionally to the pump light is less at any detuned pump wavelength than the measured ASE at the pump band center wavelength.

15. The method of claim 14, wherein the step of providing pumping light to the amplifier comprises detuning the pump light wavelength from the center wavelength in the range from about ±5 to 30 mn.

16. The method of claim 14, wherein the center wavelength is about 980 nm.

17. The method of claim 14, wherein the L-band is from about 1565–1615 nm.

18. An optical amplifier, comprising:

a rare earth doped gain stage having an emission spectrum and a known pump wavelength absorption band for amplifying an input signal having a wavelength in a long wavelength region of the emission spectrumn and a large input signal power;

a pump light source emitting an operating wavelength at a value different from a center wavelength of the pump absorption band, coupled to the gain stage;

wherein an amplified output signal has a signal power at said operating wavelength greater than an output signal when the operating wavelength is substantially the same as the center wavelength.

19. The amplifier of claim 18, wherein the long wavelength region of the emission spectrum is from about 1565–1615 nm, the center wavelength is about 980 nm, and the operating wavelength is in the range from about ±5–30 nm from the center wavelength.

* * * * *